US006233064B1

(12) United States Patent
Griffin

(10) Patent No.: US 6,233,064 B1
(45) Date of Patent: May 15, 2001

(54) VERTICALLY ORIENTED WINDOW DOCUMENT SCANNER

(76) Inventor: Brian David Griffin, 308 Hills Rd., Nokomis, FL (US) 34275

( * ) Notice: Subject to any disclaimer, the term of this patent is extended or adjusted under 35 U.S.C. 154(b) by 0 days.

(21) Appl. No.: 09/105,926

(22) Filed: Jun. 27, 1998

(51) Int. Cl.[7] .................................................. H04N 1/04

(52) U.S. Cl. ........................................................ 358/474

(58) Field of Search .................................... 358/487, 493, 358/474, 496, 497, 494; 355/25

(56) References Cited

U.S. PATENT DOCUMENTS

| | | |
|---|---|---|
| 1,466,766 | 9/1923 | Stewien . |
| 1,612,832 | 1/1927 | Powers . |
| 2,180,007 | 11/1939 | Hopkins . |
| 3,207,908 | 9/1965 | Murphy . |
| 3,541,580 | 11/1970 | Saito . |
| 3,635,557 | 1/1972 | Alderton . |
| 3,726,589 | 4/1973 | Difulvio . |
| 3,888,584 | 6/1975 | Smith . |
| 4,009,954 | 3/1977 | Ritzeufeld . |
| 4,068,950 | 1/1978 | Kito . |
| 4,145,138 | 3/1979 | Mercure . |
| 4,386,846 | 6/1983 | Clark . |
| 4,439,036 | 3/1984 | Davis . |
| 4,440,491 | 4/1984 | Takahara . |
| 4,567,528 | 1/1986 | Wilman . |
| 4,585,334 | 4/1986 | Malyon . |
| 4,623,247 | 11/1986 | Wilman . |
| 4,636,868 | 1/1987 | Malyon . |
| 4,645,332 | 2/1987 | Malyon . |
| 4,814,606 * | 3/1989 | Lee et al. .............................. 250/235 |
| 5,053,819 | 10/1991 | Malyon . |
| 5,258,806 | 11/1993 | Bares . |

(List continued on next page.)

OTHER PUBLICATIONS

Darrell Rigby et al, The Price is Right, Business 2.0, May 2000 p. 459, vol. 5—Issue 5, Imagine Media Inc., Brisbane California.

Saint Matthew, The Gospel According to St. Matthew, The New Testament, no date, pp. 20–23, The World Home Bible League, South Holland, Illinois.

Saint Matthew The Gospel According to St. Matthew, The New Testament, no date, pp. 39–40, The World Home Bible League, South Holland, Illinois.

Eugene A. Avallone Editor et al., Marks'Standard Handbook For Mechanical Engineers—Tenth Edition, Preface to the First Edition* 1996, pp. XVII McGraw–Hill New York.

Hewlett Packard Company, Suggestion Evaluation Agreement (Ref:IH0271) Letter, Aug. 25, 1998, Cover Letter Page, Palo Alto.

IBM et al., Submission Agreement, Nov. 3, 1998, pp. 5–6, Yorktown Heights, NY.

Carl R. Moller, Chemistry of Organic Compounds, 1965 p. 860, W.B. Saunders Company, Philadelphia.

Paul L. Munson et al., Chapter 75/Plasma Lipid Modifying Agents Principle of Pharmacology, 1995, p. 1202, Chapman & Hall, New York.

Tom D. Crouch, The Bishop's Boys, 1989, p. 246 W.W. Norton & Company, New York.

Bill Howard, Looking Ahead in 2000, PC Magazine Jan. 4, 2000 p. 93, vol. 19 No. 1, Ziff Davis, New York.

Ralph G. Martin, Henry and Clare, 1991, p. 295 G.P. Putnam & Sons, New York.

Brian Griffin, Letter, Mar. 19, 2000, Nokons Florida.

*Primary Examiner*—Cheukfan Lee

(57) ABSTRACT

Scanner with a cabinet housing having a vertically inclined angled side with a rectangular transparent window for a two-demensional scanning means. Orienting the window vertically permits the scanner to have a much smaller footprint than a standard flatbed scanner. A document support stationed by the window's external lower edge prevents a document to be scanned from sliding off the window.

18 Claims, 14 Drawing Sheets

U.S. PATENT DOCUMENTS

| | | |
|---|---|---|
| 5,331,434 * | 7/1994 | Kikinis .................................. 358/474 |
| 5,416,610 * | 5/1995 | Kikinis .................................. 358/474 |
| 5,475,505 | 12/1995 | Mingslam . |
| 5,548,417 * | 8/1996 | Sekimoto et al. . |
| 5,564,686 | 10/1996 | Horng . |
| 5,636,006 | 6/1997 | Wu . |
| 5,712,718 | 1/1998 | Chen . |
| 5,903,364 * | 5/1999 | Shih-Min ............................. 358/498 |

* cited by examiner

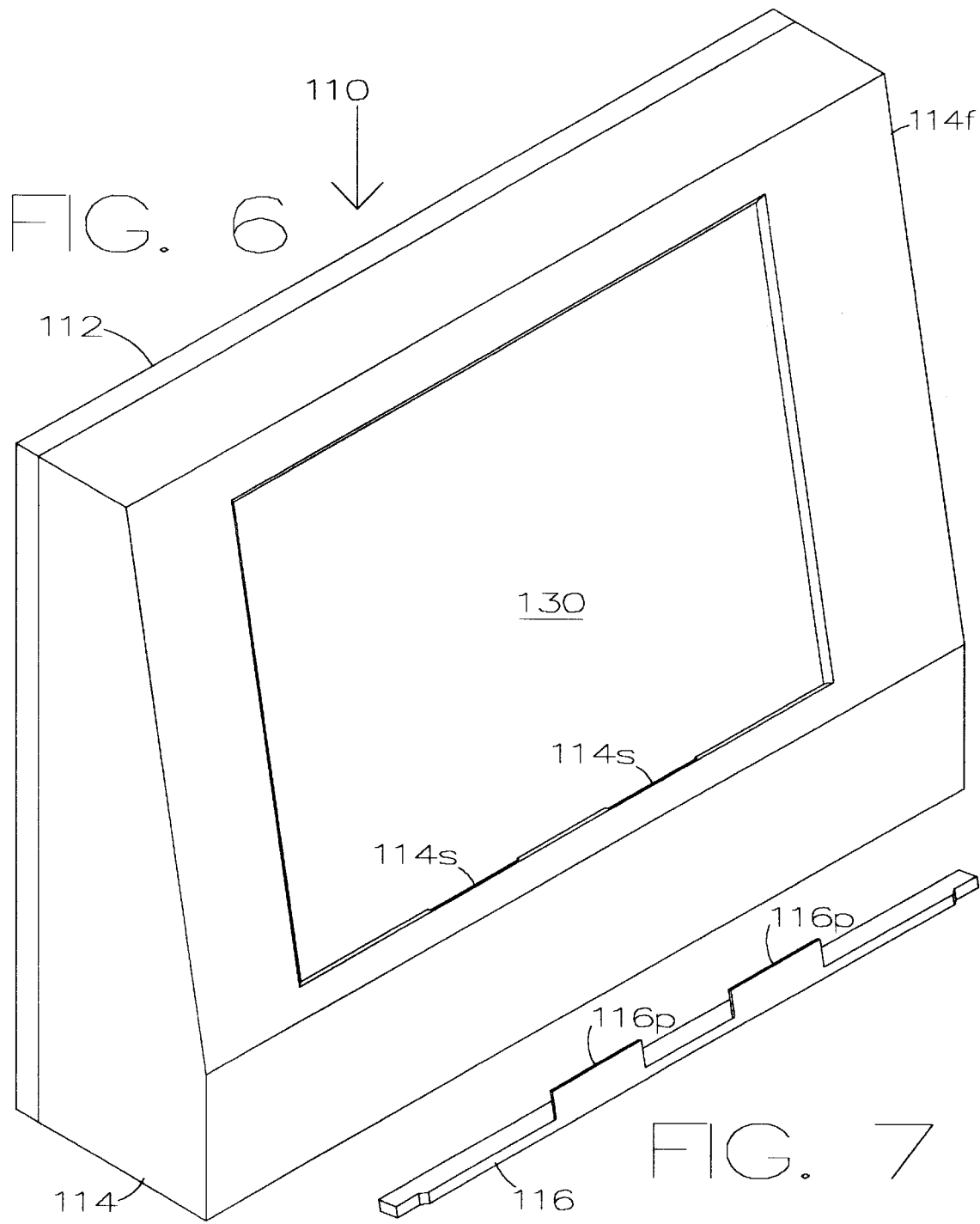

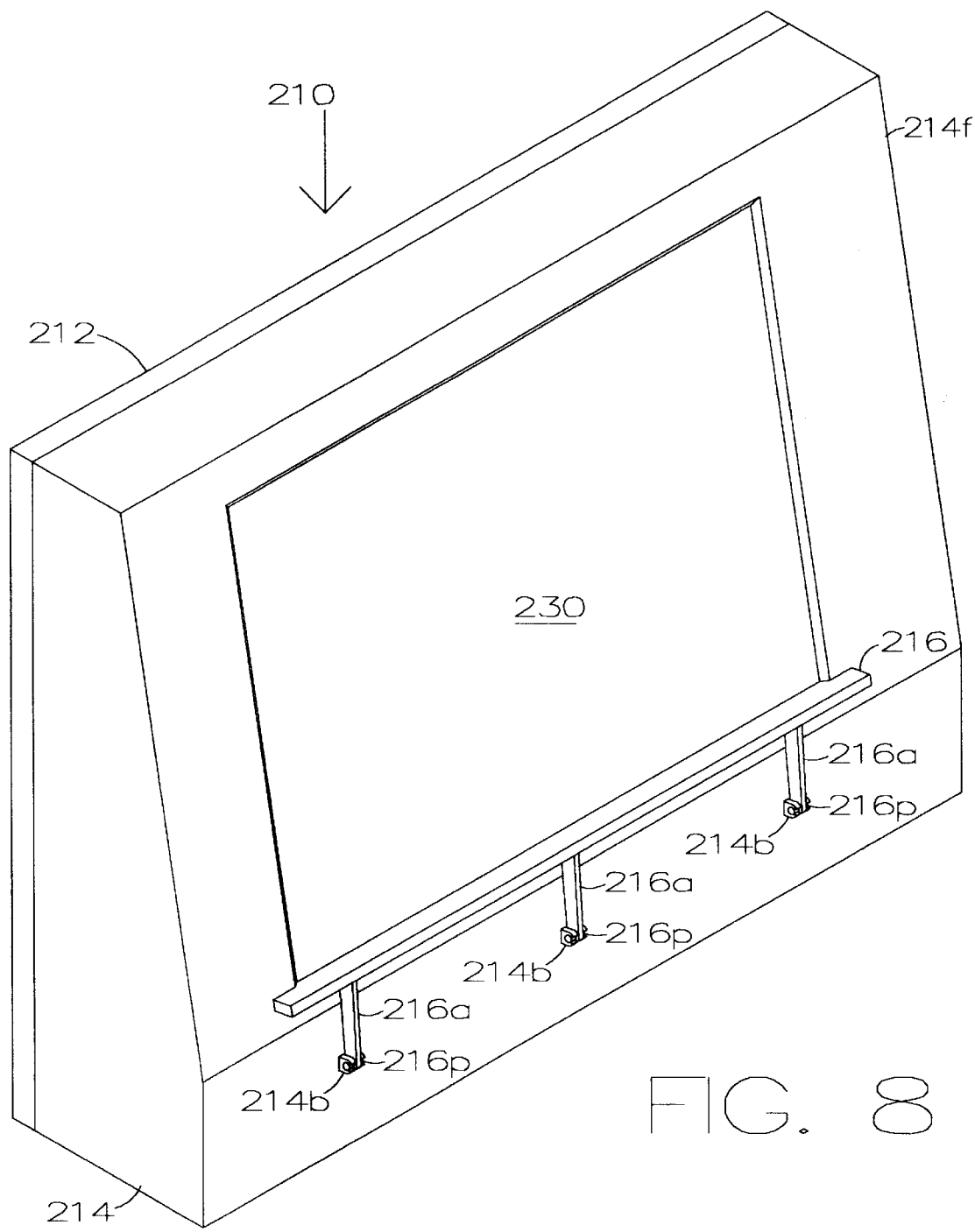

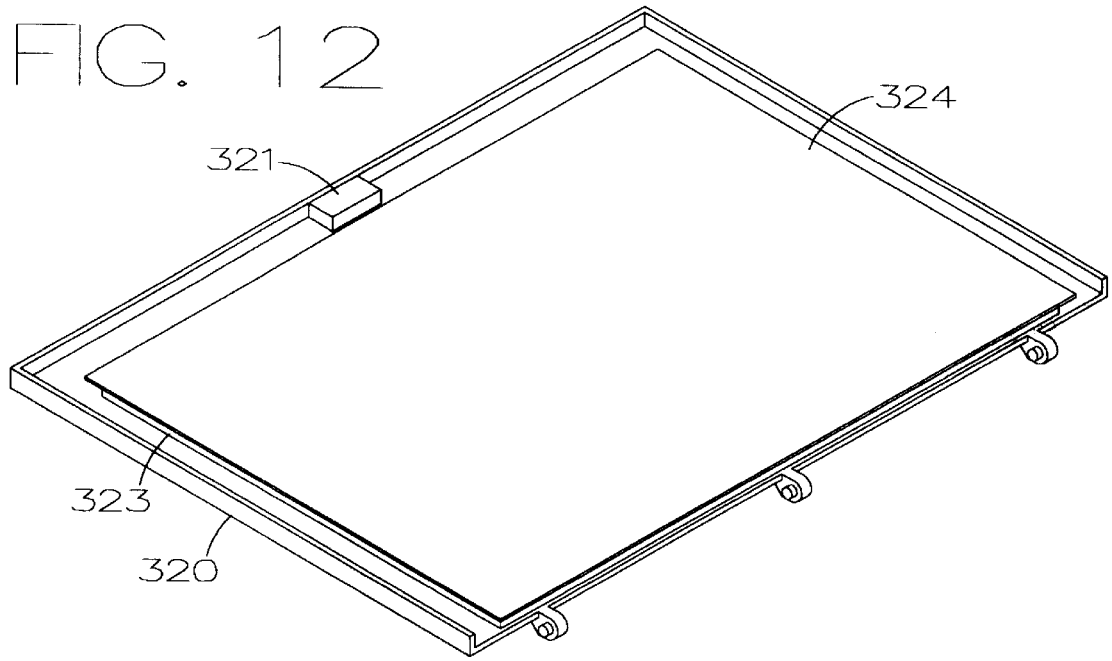
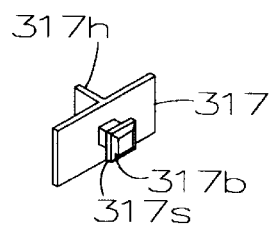
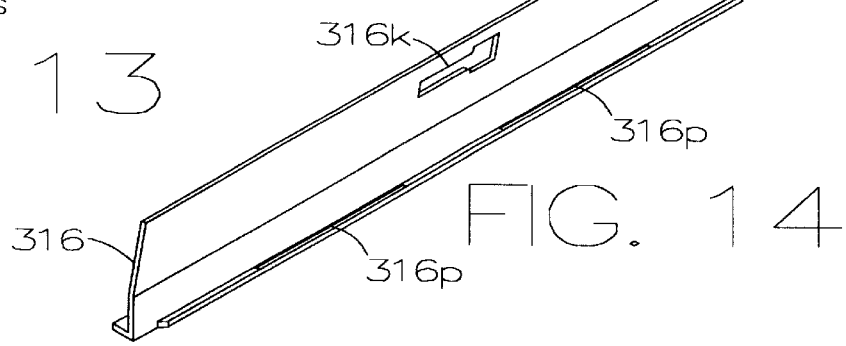

VERTICALLY ORIENTED WINDOW DOCUMENT SCANNER

BACKGROUND OF THE INVENTION

Scanners are used to scan documents like papers and books into computers. They convert a two-dimensional image on a piece of paper into a two-dimension array of pixel information that is normally stored by the computer on its hard disk. The computer can be used to modify the two-dimensional array of pixel information. The computer can also send the two-dimensional array of pixel information to a printer to produce a paper copy of the two-dimensional image. Flatbed scanners can handle both papers and books well. The only problem with flatbed scanners is the amount of space they take up on the desktop.

DESCRIPTION OF THE PRIOR ART

A wide variety of scanners are available to input image information into computers. These scanners offer a trade-off between size, cost, and ease of use.

The oldest type is a drum scanner. A transparency of the image is wrapped around a glass tube. The tube is then turned while a light source shines through the transparency onto a light detector. The light source and light detector are then moved along the length of the tube.

The first scanners used by personal computer users were hand-held. These hand-held scanners had wheels, a light source, and a linear photodetector array inside a housing. As the scanner was pushed across the image by hand, the wheels would turn. As the wheels turned, the photodetector array would send the perceived values of the light source reflected off the image to the computer. These scanners have the advantage of being small. The quality of the image is dependent on the steadiness of the hand of the user.

The second type of scanner used by personal computer users is the flatbed scanner. The flatbed scanner has a housing larger than the sheet of paper to be scanned. The scanner is laid flat on a desk or table, which is why it is called a "flatbed" scanner. Two parallel guide rods are attached to the housing. These guide rods support a linear scanner that combines a light source and a linear photodetector array. The linear scanner is attached to and moved by a notched continuous belt or cable loop stretched between an idler and a gear a driven by a motor. A window to support the paper or book to be scanned is on top of the housing. A cover hinged to the top of the housing is provided to hold the paper flat and to exclude external light from the linear photodetector array.

The third type of scanner has a housing with a motorized paper feed. A fixed linear scanner is placed along the motorized paper feed. The disadvantage is that a book is bound and can't pass through the paper feed opening.

The fourth type of scanner has long narrow base with a detachable unit wherein the linear scanner is combined with the motorized paper feed. A sheet of paper can be feed into the scanner and scanned as in the third type of scanner. In addition, the detachable unit can crawl along the open pages of a book. The disadvantage is that the detachable unit can slip on the open page or crawl off the desktop.

The fifth type of scanner is used to scan transparencies. Typically, a carrier holds a film strip. The carrier is moved relative to a light source and a linear photodetector array. The carrier and the one-dimensional linear photodetector array may be vertical or horizontal depending on the brand.

The flatbed scanner is the product of choice in the consumer marketplace. A flatbed scanner is now very affordable. The only problem with a flatbed scanner is that it hogs space. A possible solution to the flatbed scanner desktop space problem is to rotate the scanner to be vertical. Two problems emerge: the piece of paper to be scanned slides down and the cover falls down.

Brian R. Malyon's U.S. Pat. No. 4,585,334 discloses a book photocopier with a "window even inclined to the vertical so as to present an inclined surface on which a document can be laid". Using a sheet of paper on a book or a cookie sheet, it can be seen that documents slide along inclined surfaces when the inclination rises above about 25 degrees from the horizontal. The document support ledge needed to prevent sliding is not shown in the Malyon patent.

Minasian & Schreiner's U.S. Pat. No. 5.475,505 describes a canted platen input scanner book copier. Their transparent windows are shown and claimed as horizontally inclined because they measure the claimed angles from vertical. They don't use inclination to reduce the footprint of a scanner. They also lack a document support ledge at the lower external edge of a transparent window.

SUMMARY OF THE INVENTION

A cabinet housing is shaped to be self-supporting and to hold a transparent window at a vertically oriented angle. The cabinet housing also holds a two-dimensional scanning reader means. A document support ledge is horizontally placed parallel to the lower external edge of the window. The document support ledge keeps a document, with an image to be scanned, from falling down. A magnet on the top of the cover can be used to keep the cover from falling down. In addition, a second set of feet are added to the cabinet housing to support the scanner from its new bottom.

BRIEF DESCRIPTION OF THE DRAWINGS

FIG. 6 is an oblique view of an embodiment without its slide-out document support ledge ready to copy a large book.

FIG. 7 is an oblique view of the slide-out document support ledge rotated upside down.

FIG. 8 is an oblique view of an embodiment using a flip-down document support ledge stationed for copying papers.

FIG. 12 is an oblique view of the molded cover rotated to show the foam pad, light exclusion sheet, and magnet.

FIG. 13 is an oblique view of the quick-lock connector.

FIG. 14 is an oblique view of the quick-lock document support ledge rotated upside down.

DETAILED DESCRIPTION OF THE DRAWINGS

Basic Embodiment

Figure 1:
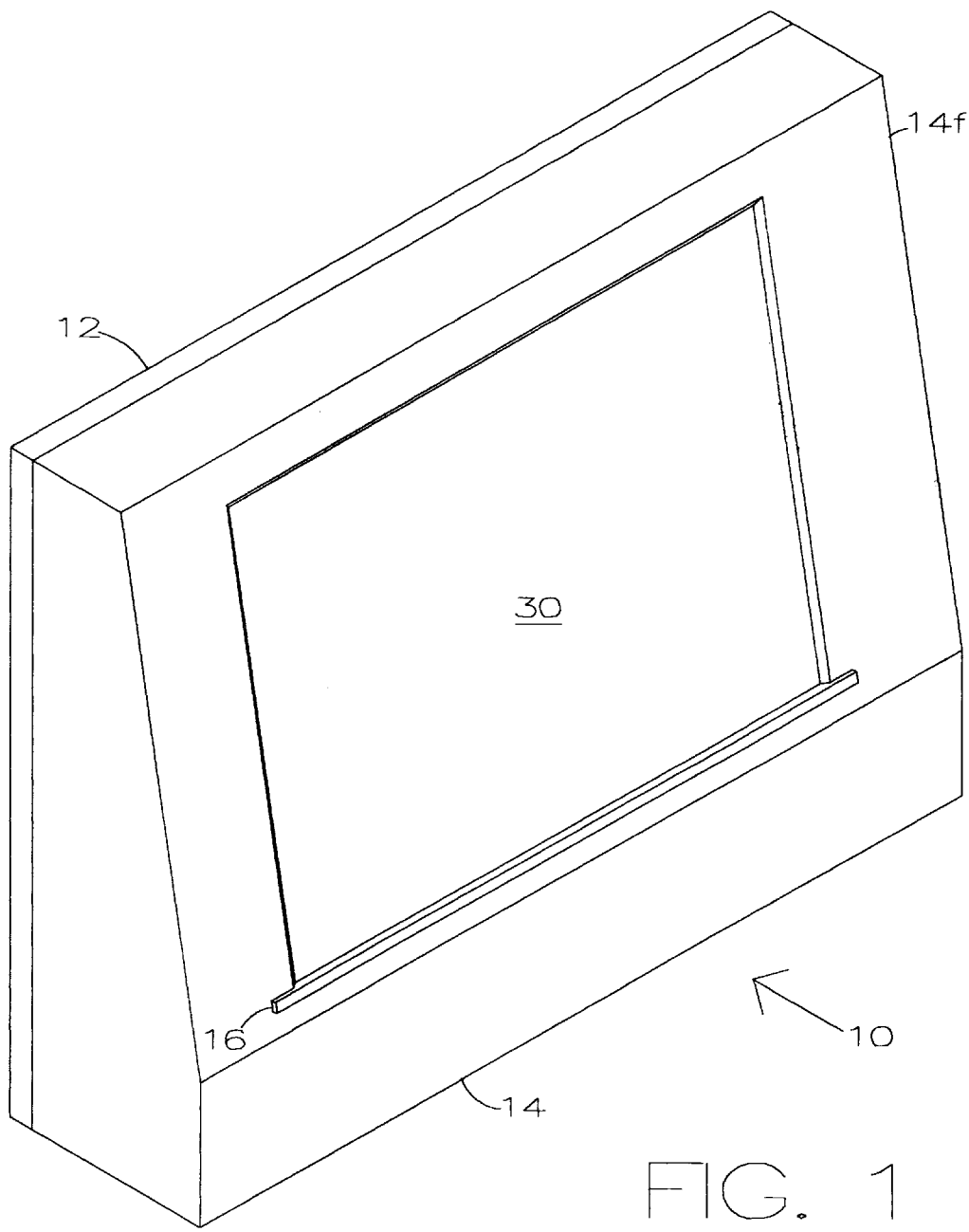
FIG. 1 is an oblique view of the basic embodiment.

An oblique view of the basic embodiment of the invention is shown in FIG. 1. The basic cabinet housing 10 is made from rigid plastic. The housing has a back section 12 and a front section 14 that are screwed together.

A rectangular transparent window 30 is attached to the vertically oriented angled face 14f of the front section 14. The size of the window is approximately the standard paper size in the country where the apparatus is to be sold. In the United States, the standard paper size is eight and one-half by eleven Inches.

A basic document support ledge 16 is molded together with the front section 14. The basic document support ledge forms the lower external edge of the rectangular transparent window 30. The support ledge prevents a document from sliding along the plane of the window.

Experimentation shows that the basic document ledge support 16 should have a width of at least one-fifth of an inch as shown to reliably catch and hold a sheet of paper deposited onto the support. A sheet of paper is not normally flat because of humidity, printer induced curling, hand moisture induced curling, and post office handling.

The basic document support ledge 16 should not be too wide because it can interfere too much with copying books whose pages are larger than the rectangular transparent window 30.

A two-dimensional scanning reader means 40 is taken from a Mustek 600 III EP Plus flatbed scanner (not shown). This scanner is widely available at the present time. Other commercial flatbed scanners are very similar and can be cannibalized instead.

Figure 2:
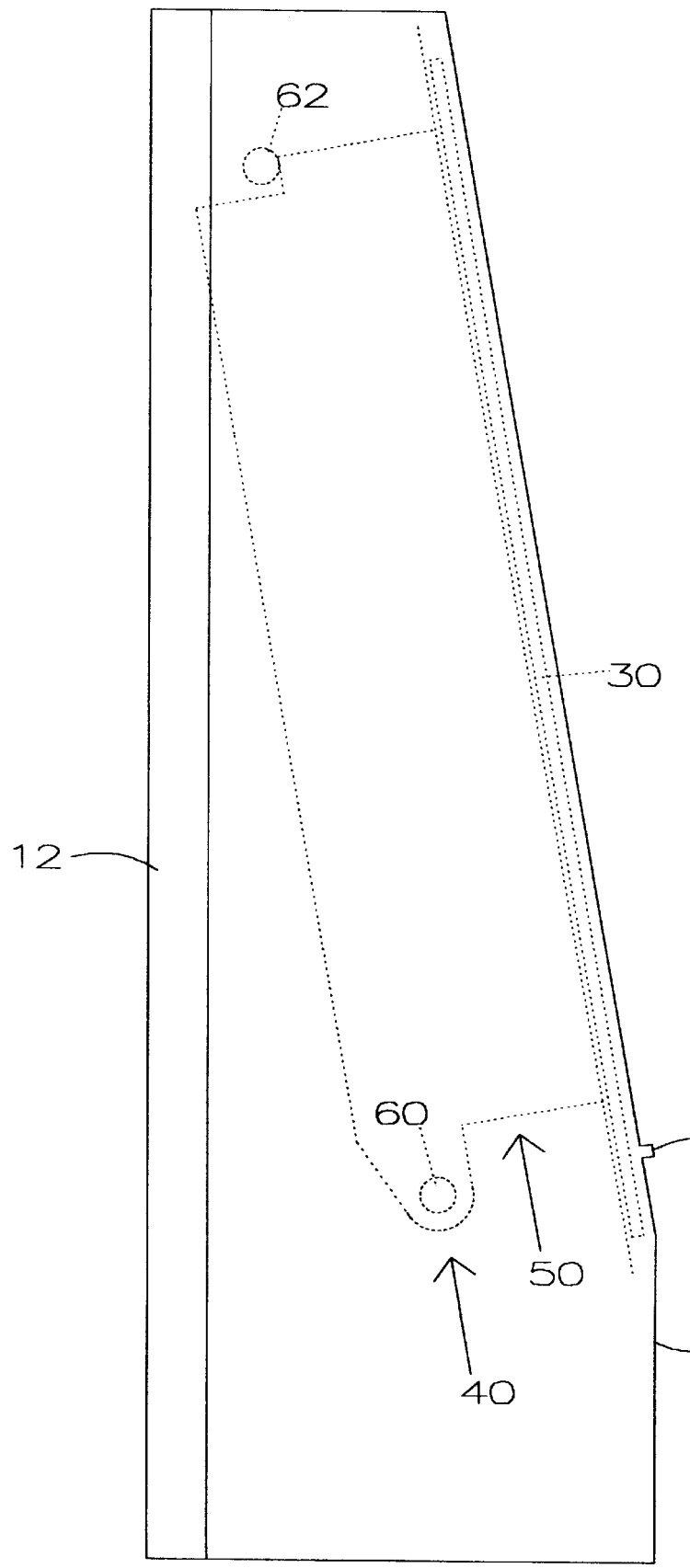
FIG. 2 is a side view of the basic embodiment outlining the orientation of the enclosed two-dimensional scanning reader means.

The two-dimensional scanning reader means 40 includes a linear scanner 50 which should be mounted inside the basic cabinet housing 10 as outlined in FIG. 2. The linear scanner 50 performs a one-dimensional linear scan. The linear scanner is supported on the lower guide rod 60 and the upper guide rod 62 parallel to the rectangular transparent window 30. A stepper motor[not shown] drives a series of reducing gears[not shown] that drive a cable[not shown] attached to the linear scanner 50 by a spring[not shown]. A idler[not shown] is used to maintain the cable in a fixed length loop[not shown]. Only Mustek uses a cable, other brands use a notched belt[not shown] with a spring-tensioned idler[not shown].

Figure 3:
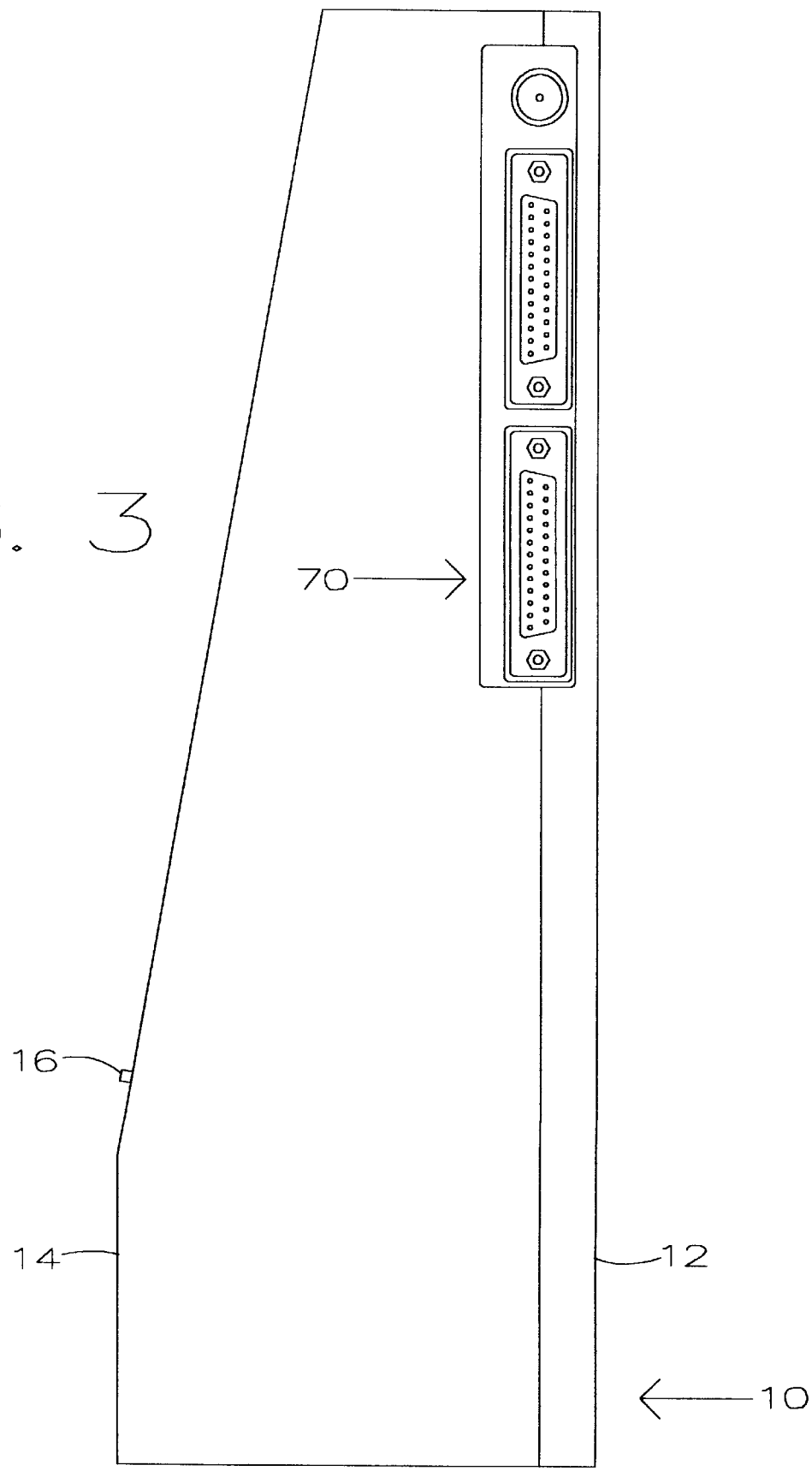
FIG. 3 is rear view of the basic embodiment showing the external part of the external computation device (parallel port) interface.

An external computational device interface 70 is mounted on the rear of the basic cabinet housing 10 as shown in FIG. 3. The interface allows the apparatus to be connected to an external computational device like a personal computer[not shown]. The interface is taken from a Mustek 600 III EP Plus flatbed scanner. The interface is meant for a parallel port[not shown] of a personal computer. Storm Technology has developed an interface [not shown] for the Universal Serial Bus (USB)[not shown].

The external computational device interface 70 and the two-dimensional scanning reader means 40 are connected through a common circuit board[not shown] that is taken from the Mustek 600 III EP Plus scanner. All embodiments use this arrangement.

Figure 4:
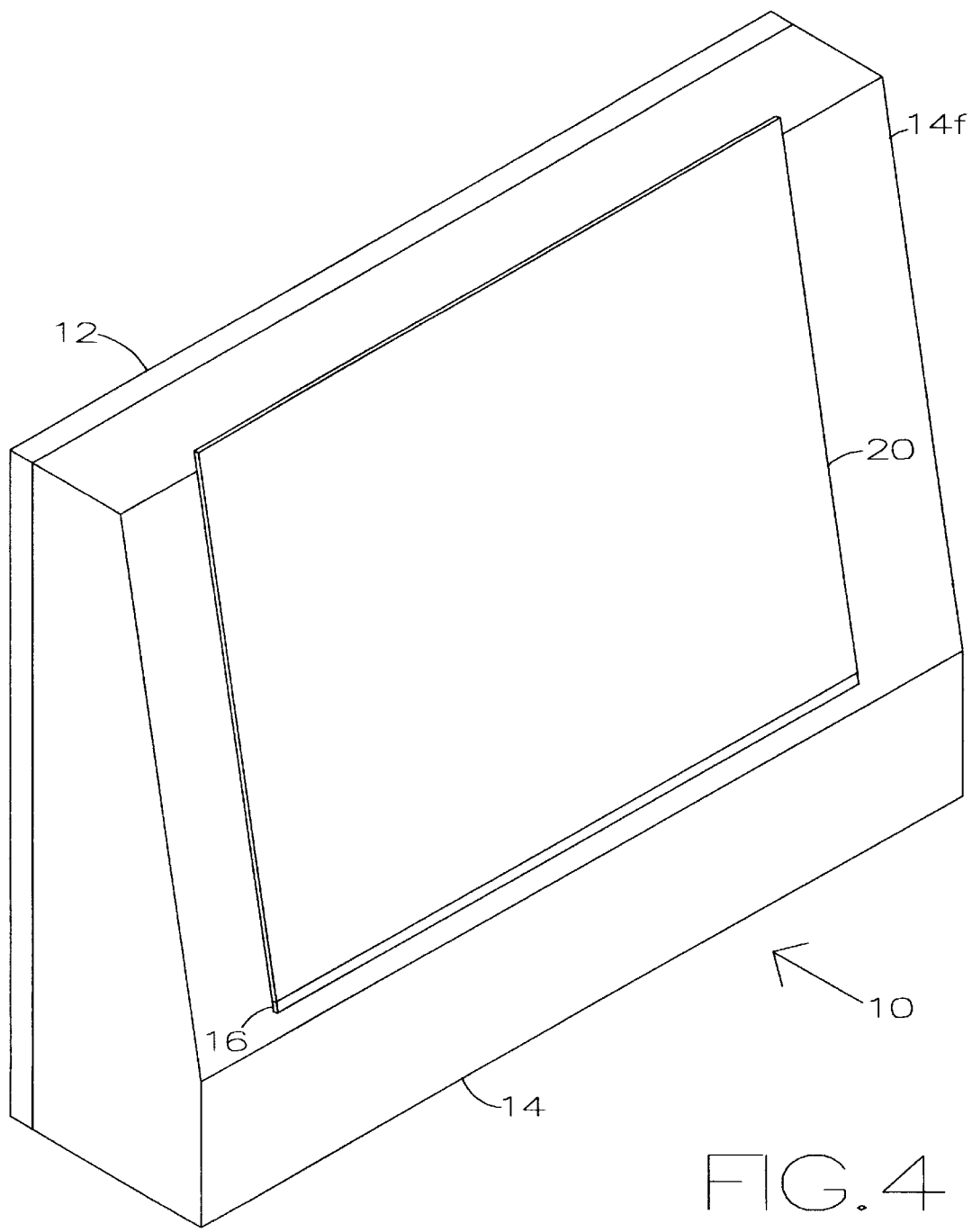
FIG. 4 is an oblique view of the basic embodiment with a drop-on cover to exclude stray light.

A drop-on cover 20 can be set on the basic document support ledge 16 as shown in FIG. 4. The cover should be larger that the exposed part of the rectangular window 30. The cover should also be rigid so it will lie close against the vertically oriented angled face 14f to exclude stray light from the two-dimensional scanning reader means 40.

The drop-on cover 20 is only needed when the document to be scanned is translucent, transparent, or smaller than the rectangular transparent window 30.

Embodiment Using a Slide-out Document Support Ledge

Figure 5:
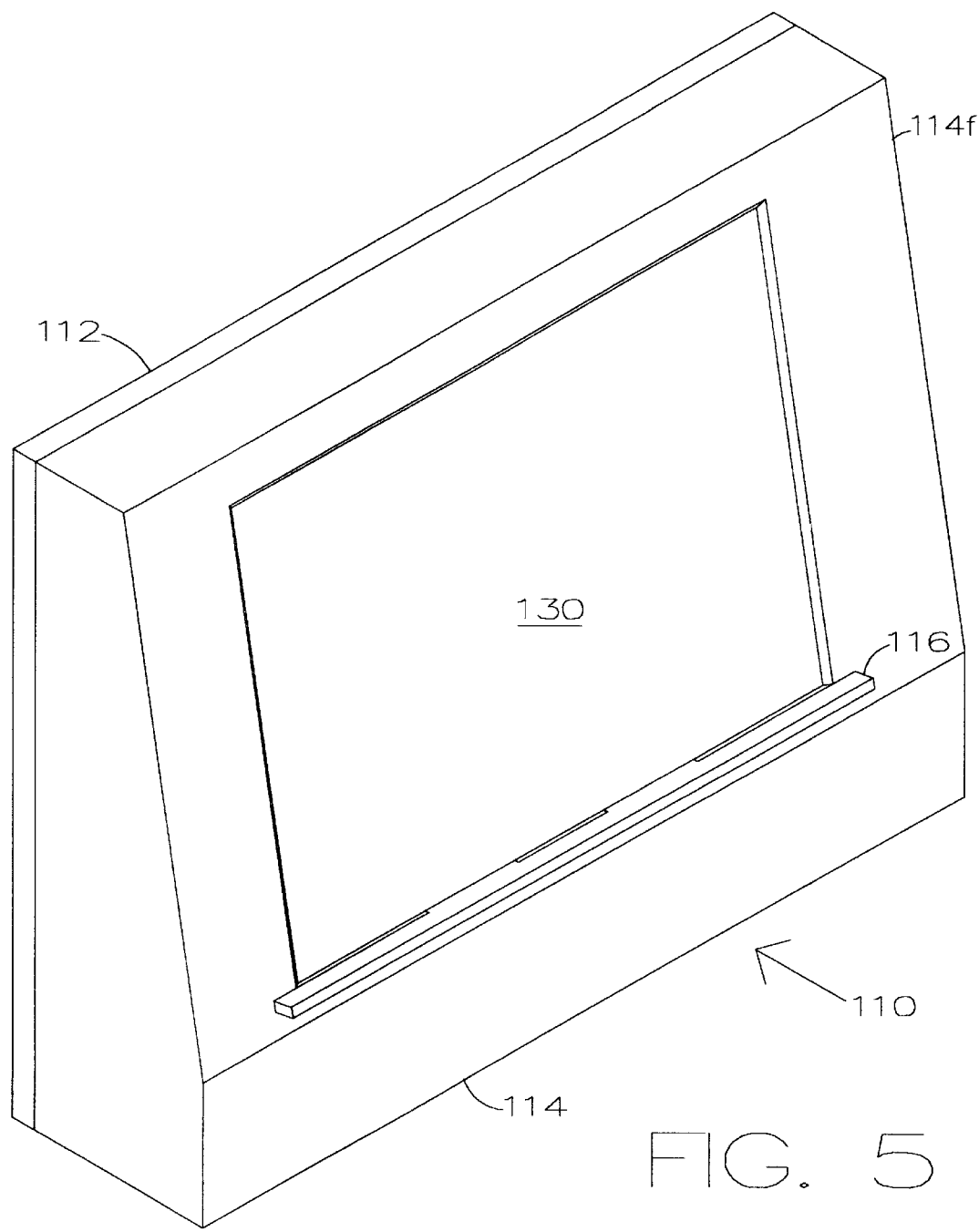
FIG. 5 is an oblique view of an embodiment using a slide-out document support ledge.

An embodiment of the invention using a slide-out document support ledge is shown in FIG. 5. The slide-out document support ledge 116 can be removed when it would interfere with copying books whose pages are larger than the rectangular transparent window 130. Because the slide-out document support ledge can be removed, it can and should be much wider than the basic document support ledge 16.

The back section 112 and rectangular transparent window 130 are identical to their counterparts in the basic embodiment. As shown in FIG. 6, the angled face 114f of the front section 114 of the cabinet housing 110 has two slots 114s that are spaced apart. These slots allow the rectangular transparent window to be glued to the front section between the two slots. These slots accommodate the prongs 116p of the slide-out document support ledge 116 shown rotated upside down in FIG. 7.

Embodiment Using a Flip-down Document Support Ledge

An embodiment of the Invention using a flip-down document support ledge is shown in FIG. 8. The flip-down document support ledge 216 can be flipped down when it would interfere with copying books whose pages are larger than the rectangular transparent window 230. Because the flip-down document support ledge can be flipped down out of the way, it can and should be much wider than the basic document support ledge 16.

Figure 9:
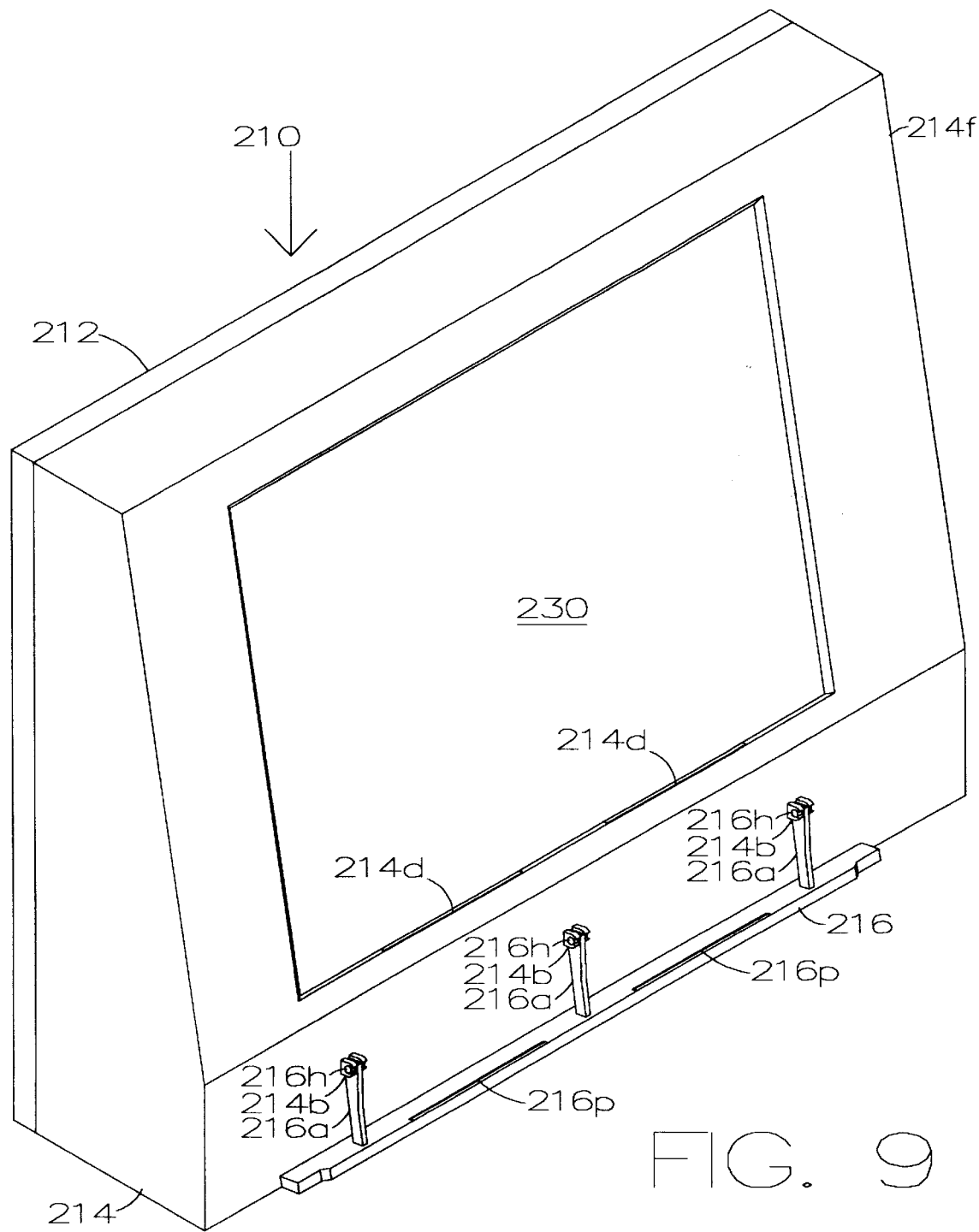
FIG. 9 is an oblique view of an embodiment with the flip-down document support ledge flipped down to copy large books.

The back section 212 and rectangular transparent window 230 are identical to their counterparts in the basic embodiment. The three pairs of hinge bearings 214b are placed below the angled face 214f of the front section 214 of the cabinet housing 210. Each pair of hinge bearings holds a hinge pin 216h of the flip-down document support ledge 216. The flip-down document support ledge 216 is shown rotated upside down in FIG. 9.

The flip-down document support ledge 216 has two projections 216p that are shaped to fit into the slot-like furrowed retaining depressions 214d of the front section 214. When the projections are snapped into the retaining depressions, the document support ledge 216 will be firmly stationed against the rectangular transparent window 230. The projections 216p are centered between the arms 216a to minimize the amount of force needed to snap the support ledge 216 into place against the window 230.

The use of a flip-down document support ledge 216 instead of a slide-out document support ledge 116 reduces the probability that the document support ledge will be lost by the scanner user.

Inventor's Preferred Embodiment

Figure 10:
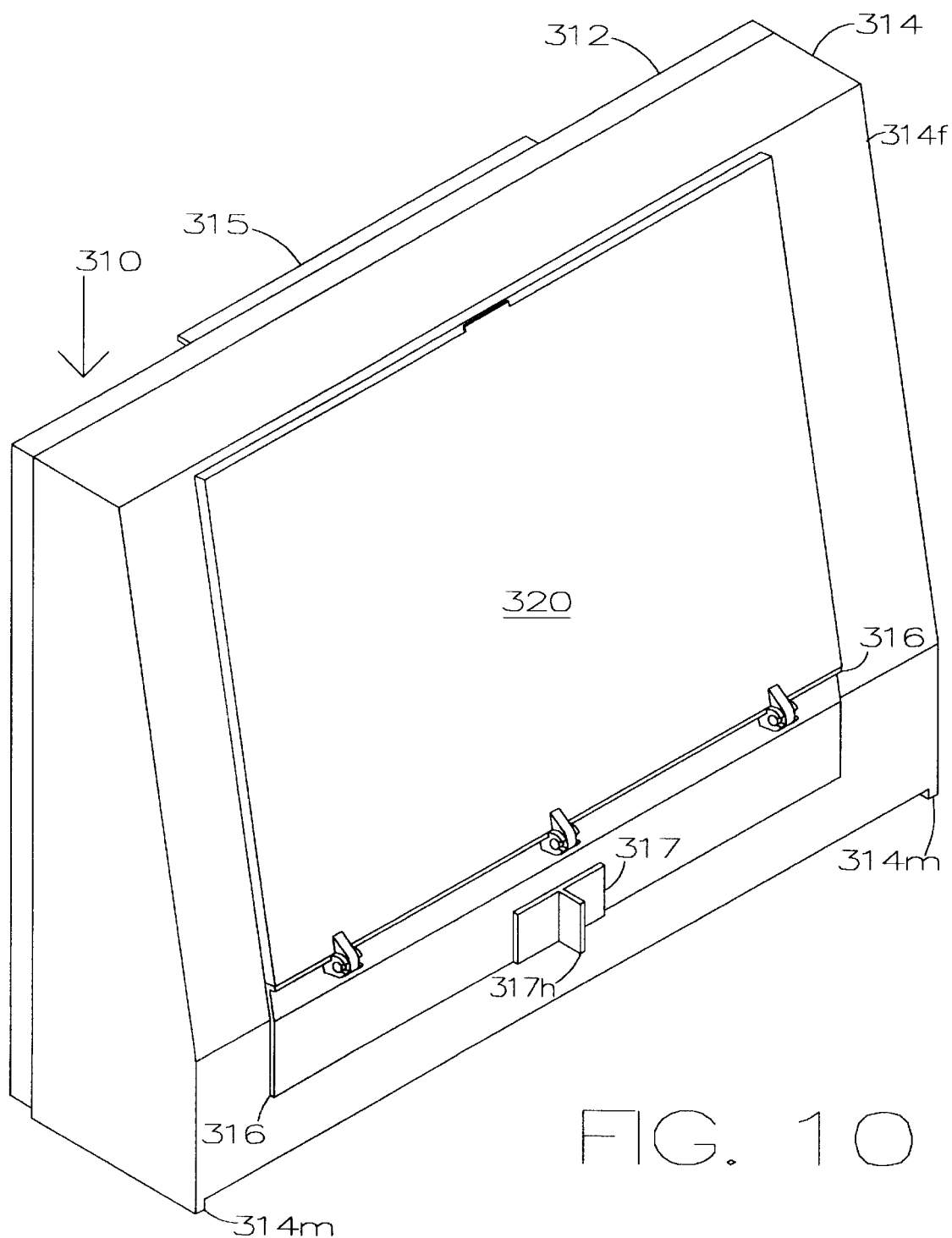
FIG. 10 is an oblique view of the inventor's preferred embodiment with a quick-lock document support ledge hinged to a molded cover.

The inventor's preferred scanner embodiment is shown in FIG. 10. The quick-lock document support ledge 316 and hinged cover 320 can be quickly removed from the cabinet housing 310. They should be removed when they would interfere with copying books whose pages are larger than the rectangular transparent window 330. The quick-lock document support ledge is attached to the front section 314 by the quick-lock connector 317 shown in FIG. 13.

To remove the quick-lock document support ledge 316 so large books can be copied, the quick-lock connector 317 must be moved to the right part of the keyhole 314k in the front section 314. The quick-lock document support ledge can then be lifted off the front section. To help prevent the quick-lock connector from getting lost, the keyhole 316k in the quick-lock document support ledge is oriented in the opposite direction. To isolate the connector 317 as shown in FIG. 13, two contradictory movements are needed.

The quick-lock connector 317 has beveled surfaces 317b to facilitate installation. Only the four beveled surfaces shown in FIG. 13 that help it be slid perpendicularly into the front section 314 (and the quick-lock document support ledge 316) are shown. There are also four more identical beveled surfaces behind the surfaces 317s. Some of these beveled surfaces facilitate lateral movement in the first keyhole 314k. A handle 317h also makes it easy to move the connector laterally. The connector is large enough to hide the keyholes 316k and 314k.

The quick-lock document support ledge 316 is shown rotated upside down in FIG. 14. The rotation rotates the apparent direction of the second keyhole 316k. The rotation shows that the quick-lock document support ledge 316 has two projections 316p that are shaped to fit into the depressions 314d in the front section 314. When the projections are lowered into the depressions, the document support ledge 316 will be stationed along the lower external edge of the rectangular transparent window 330. The quick-lock connector 317 is then slipped into the keyhole 314k. The connector 317 is then quickly slid to the left to securely lock the document support ledge 316 into place on the front section 314.

Figure 16:
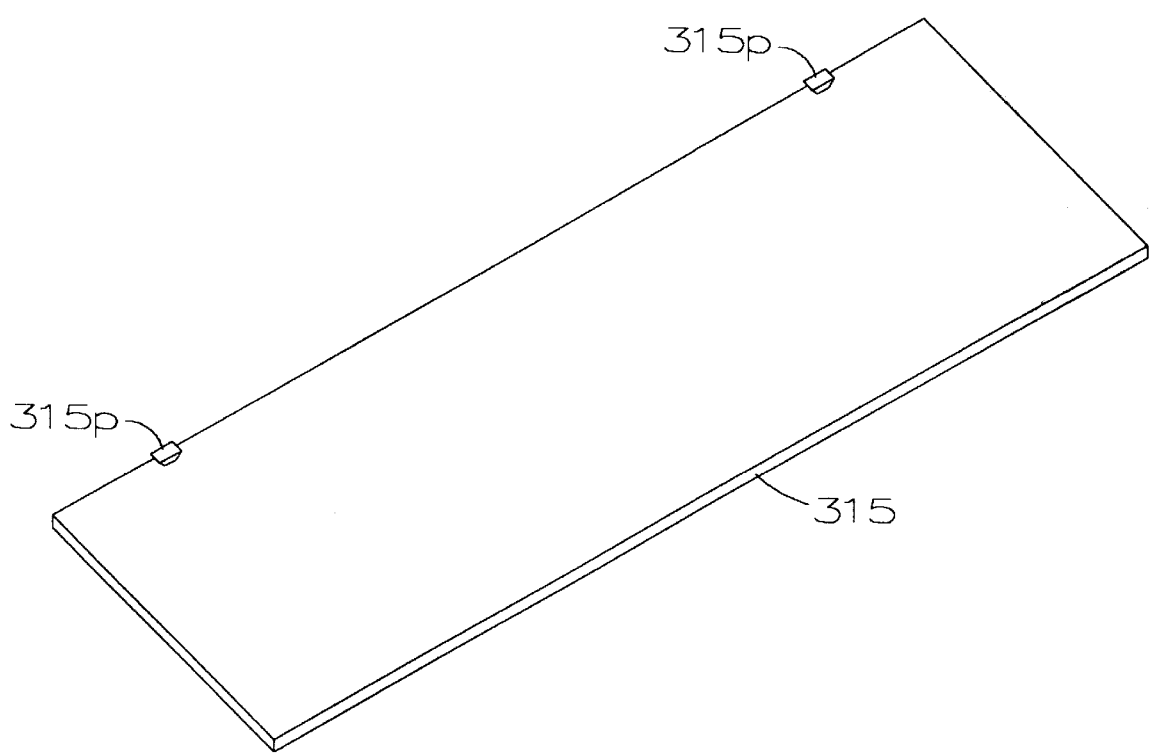
FIG. 16 is an oblique view showing only the book support slide of the inventor's preferred embodiment.

The back section 312 has been provided with a slit 312t that holds a book support slide 315. The book support slide can be pulled out to help support that portion of a book not placed over the rectangular transparent window 330. The book support slide shown in FIG. 16 has two projections 315p that fit into matching tracks[not shown] on the inside of the front section 314. The back section 312 doesn't have these matching tracks, so the slide can't be lost once the front section and the back section have been screwed together.

If the book has pages much larger than the rectangular transparent window 330, the scanner (sans the quick-lock document support ledge 316 and hinged cover 320) can be rotated to lie flat like a standard flatbed scanner. For that purpose, a first set of four feet 312s and 312l are molded into the back section 312. It would also be possible to manufacture the feet separately. The two long feet 312l protect the book support slide 315. The two short feet 312s are made shorter than the two long feet 312l to help reduce the amount of space the scanner takes up on the scanner user's desktop.

At least one rotate-out foot 313 can be used to stabilize the cabinet housing 310 when the housing is vertically positioned. Each foot 313 can be rotated about a pivot 311 riveted to the back section 312. This permits the rotate-out feet to be rotated out of the way when the cabinet housing is to be horizontally positioned like a standard flatbed scanner.

A plurality of rotate-out feet 313 allows a choice of foot deployment to fit around a personal computer monitor base[not shown] or other restraint. A plurality also allows the cabinet housing 310 to be stabilized in case one foot 313 or pivot 311 gets broken.

Alternately, a fixed foot molded with the rear section 312 or a slide-out foot like the book support slide 315 could be used. The cheaper fixed foot just couldn't be moved to avoid a possible obstacle.

The front section 314 has additional feet 314m molded on the bottom to balance the rotate-out feet 313. This second set of feet 313 and 314m is unique for a scanner. This set of feet are mounted on the front section's bottom side 314b. The bottom side is adjacent to the side of the cabinet housing 310 where the quick-lock document support ledge 316 is located.

A black light exclusion sheet 324 and foam pad 323 shown in FIG. 12 are taken from the Mustek scanner. They are glued to the hinged cover 320. The three hinge pins 320b of the hinged cover fit into the three pairs of hinge bearings 316b of the quick-lock document support ledge 316.

As in a camera, black felt could be placed around the edges of the cover 320 along the angled face 314f of the front section 314 and the document support ledge 316 to exclude stray light. Also, the surfaces of the angled face and the document support ledge could be raised adjacent to the edges of the cover to exclude stray light.

Figure 11:
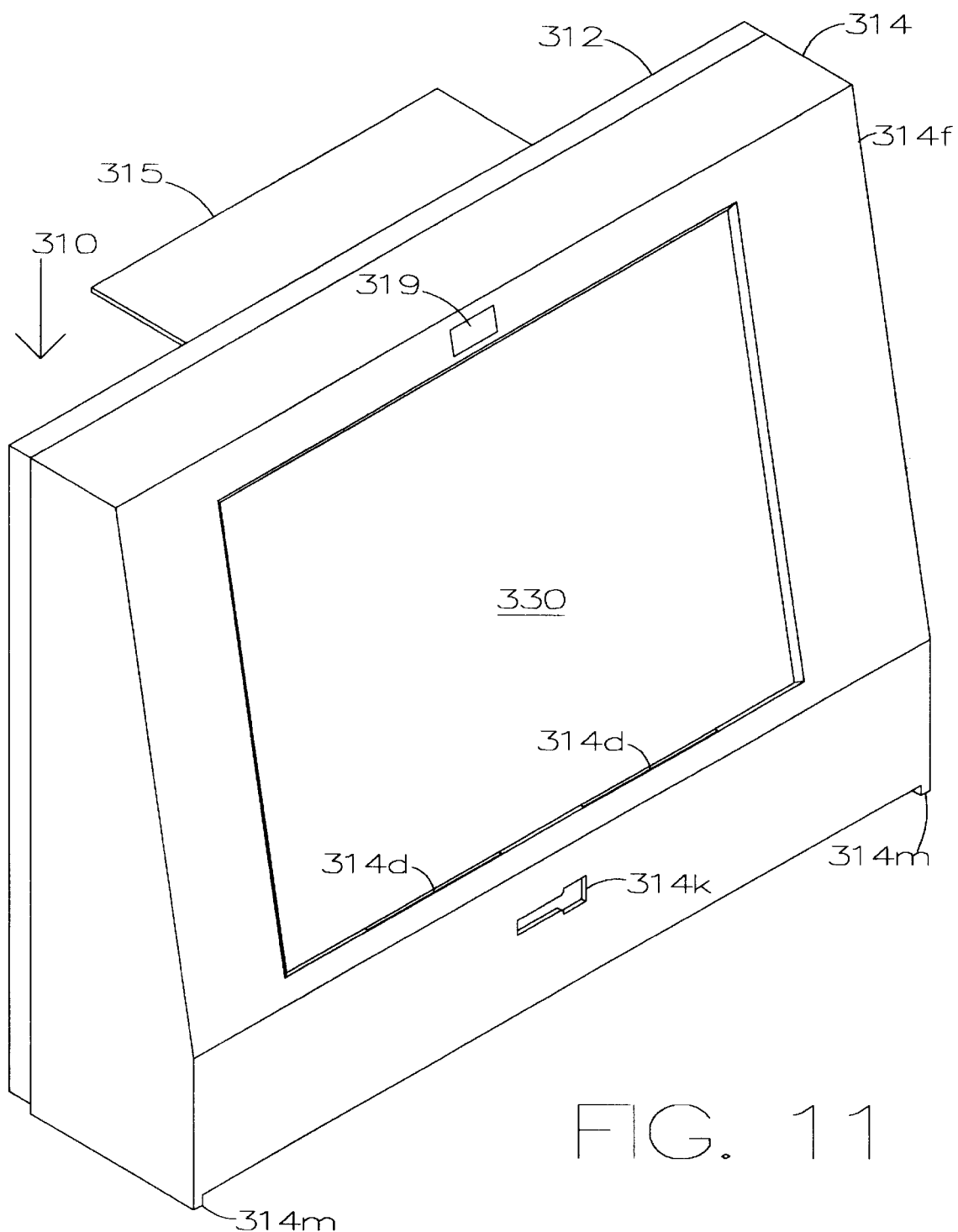
FIG. 11 is an oblique view of the inventor's preferred embodiment with the quick-lock document support ledge and molded cover removed and the book support slide extended for copying a large book.
Figure 15:
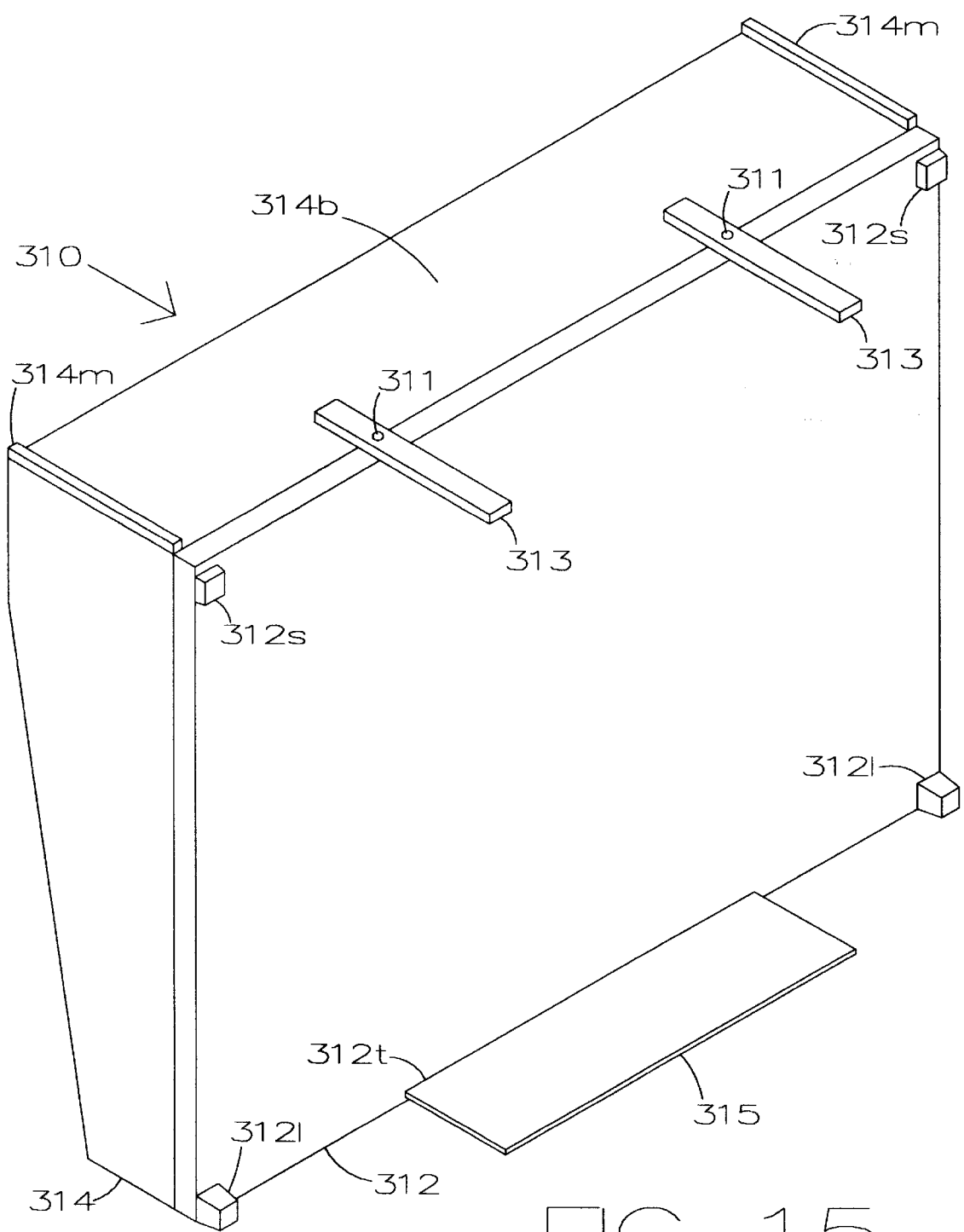
FIG. 15 is an oblique view of the inventor's preferred embodiment rotated upside down to show the rotate-out feet and book support slide extended.

A magnet 321 is placed on upper part of the cover 320. The magnet should be weak to prevent annoying the scanner user. When the cover is closed over the rectangular transparent window 330, the magnet will be placed by the ferrous part 319 set in the front section 314 of the cabinet housing 310. The ferrous part 319 would not be needed if the front section was a ferrous part made from steel. The ferrous part could be placed inside the front section instead of outside as shown in FIG. 11.

The magnet 321 and ferrous part are not essential when the rectangular transparent window 330 is angled at 80 degrees to the horizontal as shown in the figures of the embodiments described so far. A window angled less than 80 degrees will increase the footprint of the apparatus. A window angled greater than 80 degrees will decrease the footprint of the apparatus, but the user will have to handle the cover 320 more carefully to prevent the cover from falling down. As the window is inclined at a steeper angle, the magnet and ferrous part become essential. The user will also have to be careful that the paper document to be scanned doesn't buckle under its own weight.

Embodiment Using a Purely Vertical Transparent Window

Figure 17:
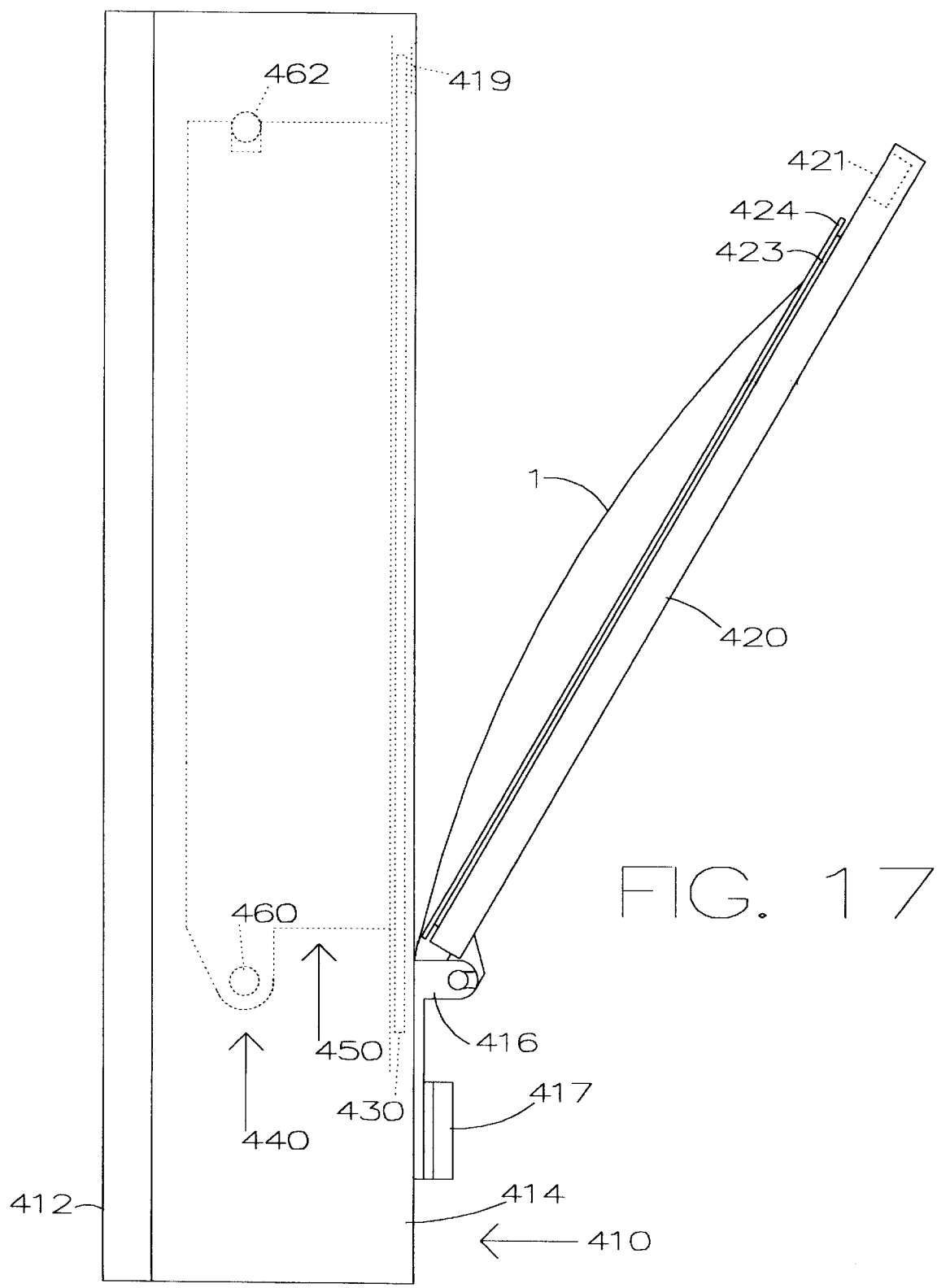
FIG. 17 is a side view of the vertical window embodiment outlining the orientation of the enclosed two-dimensional scanning reader means that also indicates how a paper is loaded into the embodiment.

It is possible to orient the rectangular transparent window 430 at purely vertical 90 degree angle to the horizontal as shown in FIG. 17. The linear scanner 450 has been modified to have a slot that slips around the upper guide rod 462. This prevents the linear scanner from teetering back and forth slightly as it is moved along the lower guide rod 460.

Alternately, a slotted plate[not shown] could be screwed onto a standard linear scanner 50, or a hook[not shown] like that used in a IBM brand scanner[not shown] could be used.

These methods prevent the linear scanner 450 from rotating around on the lower guide rod 460 away from the upper guide rod 462. These methods come into play when the two-dimensional scanning reader means 440 and the rectangular transparent window 430 parallel to it are angled at much more than 80 degrees to the horizontal. These methods hold the linear scanner against the upper guide rod using mechanical means instead of gravitational force. The rest of the two-dimensional scanning means reader may remain unchanged.

A magnet 421 is placed on upper part of the cover 420. The magnet should be weak to prevent annoying the scanner user. When the cover is closed over the rectangular transparent window 430, the magnet will be stationed by the ferrous part 419 set in the front section 414 of the cabinet housing 410.

A flexible paper 1 will tend to fall away from the rectangular transparent window 430 when the window is angled at much more than 80 degrees to the horizontal. The exact angle depends on the flexibility of the paper and skill of the user. A paper should be placed on the document support ledge 416 and light exclusion sheet 424 glued to the foam pad 423 as shown in FIG. 17. The cover should then be raised until the magnet 421 contacts the ferrous part 419.

When the rectangular transparent window 430 is vertical, the front section 414 no longer needs an angled face. The document support ledge 416 also doesn't need to be angled to fit against an angled face. The rear section 412 and quick-lock connector 417 are independent of the angle of the rectangular transparent window 430.

Other Possible Embodiments

There are many more possible embodiments than those shown here. An embodiment may be made to favor either a right-handed person or a left-handed person. The rotate-out feet 313 may be replaced by slide-out feet based on the book support slide 315.

Those skilled in the mechanical art will recognize that the invention can be practiced with modifications within the spirit and scope of the appended claims. For example, the retaining depressions 214d are similar to the slots 114p and the projections 216p are similar to the prongs 116p.

I claim:

1. Apparatus for scanning an image on a document comprising:
   a cabinet housing means shaped to hold a transparent window set at a vertically oriented angle on said cabinet housing means;
   a document support ledge means, set on said cabinet housing means along a lower external edge of said transparent window, shaped to prevent said document from sliding along said transparent window;
   a two-dimensional scanning reader means for reading said document, situated by said transparent window, set inside said cabinet housing and said transparent window;
   an external computational device interface means connected to said two-dimensional scanning reader means.

2. Apparatus according to claim 1 wherein:
   said vertically oriented angle is at approximately 80 degrees to horizontal.

3. Apparatus according to claim 1 wherein:
   said document support means is molded together with a section of said cabinet housing means.

4. Apparatus according to claim 1 wherein:
   said document support ledge means is a slide-out document support ledge slid into said cabinet housing means.

5. Apparatus according to claim 1 wherein:
   said document support ledge means is a flip-down document support ledge hinged to said cabinet housing means.

6. Apparatus according to claim 5 wherein:
   a projection is set between a pair of arms of said flip-down document support ledge;
   a retaining depression, shaped to accept and retain said projection, is provided in said cabinet housing means by said transparent window and connected to said projection to help hold said flip-down document support ledge by said transparent window.

7. Apparatus according to claim 1 wherein:
   a slot fitted for and to a prong are alternately provided to said document support means and said cabinet housing means to help firmly hold said document support means by said transparent window.

8. Apparatus according to claim 1 wherein:
   a connector with at least one beveled surface is connected to said document support ledge means and said cabinet housing means.

9. Apparatus according to claim 1 wherein:
   a book support slide is placed in top of said cabinet housing means.

10. Apparatus according to claim 1 wherein:
    a book support slide is supported in a slit in a rear section of said cabinet housing means.

11. Apparatus according to claim 10 wherein:
    said book slide support has at least one projection fitted into at least one track of a front section of said cabinet housing means.

12. Apparatus according to claim 1 wherein:
    at least one foot is extended to stabilize said cabinet housing means.

13. Apparatus according to claim 12 wherein:
    said foot is mounted on a pivot pin to make a rotate-out foot.

14. Apparatus according to claim 1 wherein:
    said cabinet housing means has a back section with a first set of feet and a bottom side with a second set of feet.

15. Apparatus according to claim 1 wherein:
    said cabinet housing means has a set of feet on a bottom side adjacent to a support side with said document support means.

16. Apparatus according to claim 1 further comprising:
    a cover supported on said document support ledge means to keep said document from falling away from said transparent window.

17. Apparatus according to claim 16 further comprising:
    a ferrous part on said cabinet housing means;
    a magnet, on said cover, to help hold said cover by and over said transparent window.

18. Apparatus according to claim 1 wherein:
    said cabinet housing means has a front section with a first keyhole;
    said document support ledge means has a second keyhole;
    said first keyhole and said second keyhole hold a connector;
    said first keyhole is oriented on said front section of said cabinet housing means so said connector must be moved right to disengage from said front section of said cabinet housing means;
    said second keyhole is oriented on said document support ledge means so said connector must be moved left to disengage from said document support ledge means to help said connector from becoming lost.

* * * * *